United States Patent
Chang et al.

(10) Patent No.: US 12,210,208 B2
(45) Date of Patent: Jan. 28, 2025

(54) DRIVING MECHANISM

(71) Applicant: TDK TAIWAN CORP., Taoyuan (TW)

(72) Inventors: Shao-Chung Chang, Taoyuan (TW); Fu-Yuan Wu, Taoyuan (TW); Yu-Huai Liao, Taoyuan (TW); Shou-Jen Liu, Taoyuan (TW); Kun-Shih Lin, Taoyuan (TW); Chien-Lun Huang, Taoyuan (TW); Shih-Wei Hung, Taoyuan (TW)

(73) Assignee: TDK TAIWAN CORP., Taoyuan (TW)

( * ) Notice: Subject to any disclaimer, the term of this patent is extended or adjusted under 35 U.S.C. 154(b) by 221 days.

(21) Appl. No.: 16/448,651

(22) Filed: Jun. 21, 2019

(65) Prior Publication Data

US 2019/0391360 A1    Dec. 26, 2019

Related U.S. Application Data

(60) Provisional application No. 62/688,694, filed on Jun. 22, 2018.

(51) Int. Cl.
*G02B 7/09* (2021.01)
*G02B 27/64* (2006.01)
*H02K 41/035* (2006.01)

(52) U.S. Cl.
CPC ............. *G02B 7/09* (2013.01); *G02B 27/646* (2013.01); *H02K 41/0354* (2013.01)

(58) Field of Classification Search
CPC .......... G02B 7/09; G02B 27/646; G02B 7/08; H02K 41/0354; H02K 11/21; H02K 11/00; H02K 11/30; G03B 13/36; G03B 5/00
See application file for complete search history.

(56) References Cited

U.S. PATENT DOCUMENTS 9,794,459 B1 * 10/2017 Kim .................... G03B 5/00
9,885,879 B2 * 2/2018 Kim .................... G02B 7/09
(Continued)

FOREIGN PATENT DOCUMENTS

CN      102062926 A    5/2011
CN      104716458 A    6/2015
(Continued)

OTHER PUBLICATIONS

A Chinese Office Action, with Search Report issued for the corresponding Application No. CN 201910543109.2, dated Jul. 21, 2021, 7 pages.

(Continued)

*Primary Examiner* — Balram T Parbadia
*Assistant Examiner* — Gabriel A Sanz
(74) *Attorney, Agent, or Firm* — MUNCY, GEISSLER, OLDS & LOWE, P.C.

(57) ABSTRACT

A driving mechanism is provided for moving an optical element, including a fixed module, a movable module holding the optical element, a driving assembly for driving the movable module to move relative to the fixed module, a position-sensing element, and a 3D circuit. The fixed module has a base, and the position-sensing element is disposed on the base to detect the movement of the movable module relative to the fixed module. The 3D circuit is embedded in the base and electrically connected to the position-sensing element.

13 Claims, 12 Drawing Sheets

(56) References Cited

U.S. PATENT DOCUMENTS

| | | | |
|---|---|---|---|
| 2008/0055753 A1 | 3/2008 | Takahashi et al. | |
| 2011/0096419 A1* | 4/2011 | Matsuo | G02B 7/08 |
| | | | 359/820 |
| 2014/0255016 A1* | 9/2014 | Kim | G02B 27/646 |
| | | | 396/55 |
| 2015/0261067 A1* | 9/2015 | Jung | G02B 7/08 |
| | | | 348/208.1 |
| 2016/0154204 A1* | 6/2016 | Lim | G02B 27/646 |
| | | | 359/557 |
| 2016/0216476 A1 | 7/2016 | Lee | |
| 2017/0357076 A1* | 12/2017 | Scheele | G02B 7/026 |
| 2018/0035022 A1 | 2/2018 | Wang et al. | |
| 2018/0239106 A1* | 8/2018 | Lee | G02B 27/646 |
| 2018/0246296 A1* | 8/2018 | Sugawara | G03B 5/06 |
| 2019/0170967 A1* | 6/2019 | Jung | G01B 11/30 |
| 2019/0246490 A1* | 8/2019 | Li | H04N 5/2258 |
| 2020/0050014 A1* | 2/2020 | Park | H04N 23/687 |

FOREIGN PATENT DOCUMENTS

| | | |
|---|---|---|
| CN | 104849941 A | 8/2015 |
| CN | 205304938 U | 6/2016 |
| CN | 107193105 A | 9/2017 |
| CN | 107664895 A | 2/2018 |
| CN | 108027491 A | 5/2018 |
| CN | 207488678 U | 6/2018 |
| CN | 109728686 A | 5/2019 |
| CN | 209895121 U | 1/2020 |
| CN | 111948873 A | 11/2020 |
| JP | 2007241254 A | 9/2007 |
| JP | 2012177753 A | 9/2012 |
| JP | 201877395 A | 5/2018 |
| JP | 2018072731 A | 5/2018 |
| KR | 10-2014-0118577 | 10/2014 |
| KR | 10-2017-0126581 | 11/2017 |

OTHER PUBLICATIONS

Office Action mailed Apr. 26, 2021 in CN Application No. 201920946792.X, 7 pages.
Statement of Opinions on the Reasons for Request for Invalidation mailed Apr. 26, 2021 in CN Application No. 201920946792.X, 127 pages.
Office Action in corresponding CN Application No. 201910543109.2 mailed Jun. 1, 2022, 3 pages.
Search Report in corresponding CN Application No. 201910543109.2 mailed Jun. 1, 2022, 3 pages.
Office Action mailed Nov. 8, 2022 in CN Application No. 201910543109.2, 4 pages.

* cited by examiner

DRIVING MECHANISM

CROSS REFERENCE TO RELATED APPLICATIONS

This application claims priority of provisional U.S. Patent Application Ser. No. 62/688,694, filed on Jun. 22, 2018, the entirety of which is incorporated by reference herein.

BACKGROUND OF THE INVENTION

Field of the Invention

The application relates in general to a driving mechanism, and in particular, to a driving mechanism used to move an optical element.

Description of the Related Art

As technology has advanced, a lot of electronic devices (for example, cameras and smartphones) have incorporated the functionality of taking photographs and recording video. These electronic devices have become more commonplace, and have been developed to be more convenient and thin. More and more options are provided for users to choose from.

In some electronic devices, several coils and magnets corresponding thereto are usually used for adjusting the focus of a lens. However, miniaturization of the electronic devices may increase the difficulty of mechanical design, and it may also lead to low reliability and low driving force for moving the lens. Therefore, addressing the aforementioned problems has become a challenge.

BRIEF SUMMARY OF INVENTION

In view of the aforementioned problems, the object of the invention is to provide a driving mechanism that includes a fixed module, a movable module, a driving assembly, a position-sensing element, and a 3D circuit. The fixed module has a housing and a base connected to the housing, wherein the housing has a top cover and at least a sidewall extending from an edge of the top cover along the optical axis of the optical element. The movable module is disposed between the housing and the base for holding the optical element, wherein the movable module is movable relative to the fixed module. The driving assembly is used for driving the movable module to move relative to the fixed module. The position-sensing element is disposed on the base to detect the movement of the movable module relative to the fixed module. The 3D circuit is embedded in the base and electrically connected to the position-sensing element, wherein the 3D circuit has a first segment, a second segment, and a third segment electrically connected to each other, the first segment extends in a first direction, wherein the second and third segments are situated on a reference plane, and the first direction is not parallel to the reference plane.

In some embodiments, the height of the first segment along the optical axis is less than the height of the third segment along the optical axis.

In some embodiments, the driving assembly is electrically connected to the 3D circuit.

In some embodiments, the driving assembly is electrically connected to the position-sensing element via the 3D circuit.

In some embodiments, the base has a wall extending in a direction parallel to the optical axis, and the position-sensing element is disposed on an inner surface of the wall.

The driving mechanism as claimed in claim 5, wherein the wall has a stopper contacting and restricting the movable module in a limit position, and the stopper is closer to the movable module than the position-sensing element.

In some embodiments, the base has a quadrilateral structure, and the wall and the first segment are located on different sides of the quadrilateral structure.

In some embodiments, the 3D circuit and the base are integrally formed as one piece.

In some embodiments, the 3D circuit and the base are integrally formed by insert molding or Molded Interconnect Device (MID) technology.

In some embodiments, the second and third segments are embedded in the wall.

In some embodiments, the 3D circuit further has an extending portion connected to the third segment and protruding from a first side of the wall.

In some embodiments, the wall forms a recess with the extending portion disposed therein.

In some embodiments, the 3D circuit further has a leg protruding from a second side of the wall for connecting to an external circuit.

In some embodiments, the wall forms at least a heat dissipation hole, and a part of the 3D circuit is exposed to the heat dissipation hole.

In some embodiments, the base has a flange that forms a surface facing the sidewall and perpendicular to the optical axis.

In some embodiments, the 3D circuit forms a continuous 3D surface extending sequentially through the first, second, and third segments.

In some embodiments, the base has a protrusion extending toward the housing, and the protrusion and the second segment at least partially overlap when viewed in a direction parallel to the optical axis.

In some embodiments, the driving mechanism further includes a resilient element connecting the movable module with the fixed module, wherein the resilient element is electrically connected to the 3D circuit.

In some embodiments, the base has a quadrilateral structure, and the 3D circuit further has two conductive portions electrically connected to the resilient element, wherein the conductive portions are located at two diagonal corners of the quadrilateral structure.

In some embodiments, the base has a quadrilateral structure, and the 3D circuit further has a conductive portion electrically connected to the resilient element, wherein the conductive portion and the third segment are located near the same side of the quadrilateral structure.

BRIEF DESCRIPTION OF DRAWINGS

The invention can be more fully understood by reading the subsequent detailed description and examples with references made to the accompanying drawings, wherein.

DETAILED DESCRIPTION OF INVENTION

The making and using of the embodiments of the driving mechanism are discussed in detail below. It should be appreciated, however, that the embodiments provide many applicable inventive concepts that can be embodied in a wide variety of specific contexts. The specific embodiments discussed are merely illustrative of specific ways to make and use the embodiments, and do not limit the scope of the disclosure.

Unless defined otherwise, all technical and scientific terms used herein have the same meaning as commonly understood by one of ordinary skill in the art to which this invention belongs. It should be appreciated that each term, which is defined in a commonly used dictionary, should be interpreted as having a meaning conforming to the relative skills and the background or the context of the present disclosure, and should not be interpreted in an idealized or overly formal manner unless defined otherwise.

In the following detailed description of the preferred embodiments, reference is made to the accompanying drawings, and in which specific embodiments of which the invention may be practiced are shown by way of illustration. In this regard, directional terminology, such as "top," "bottom," "left," "right," "front," "back," etc., is used with reference to the orientation of the figures being described. The components of the present invention can be positioned in a number of different orientations. As such, the directional terminology is used for the purposes of illustration and is in no way limiting.

Figure 1:
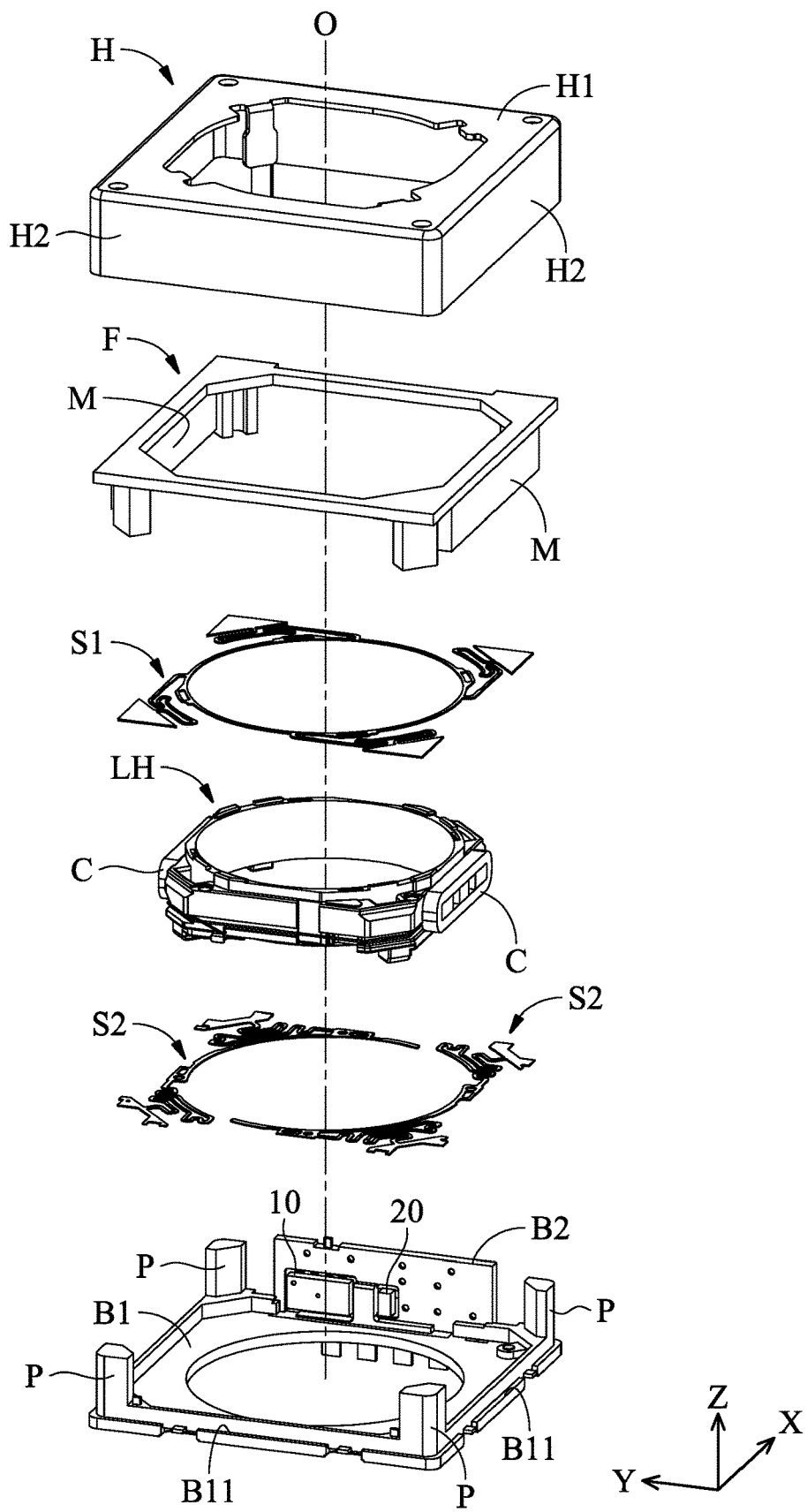
FIGS. 1 and 2 show exploded diagrams of a driving mechanism in accordance of an embodiment of the invention.
Figure 2:
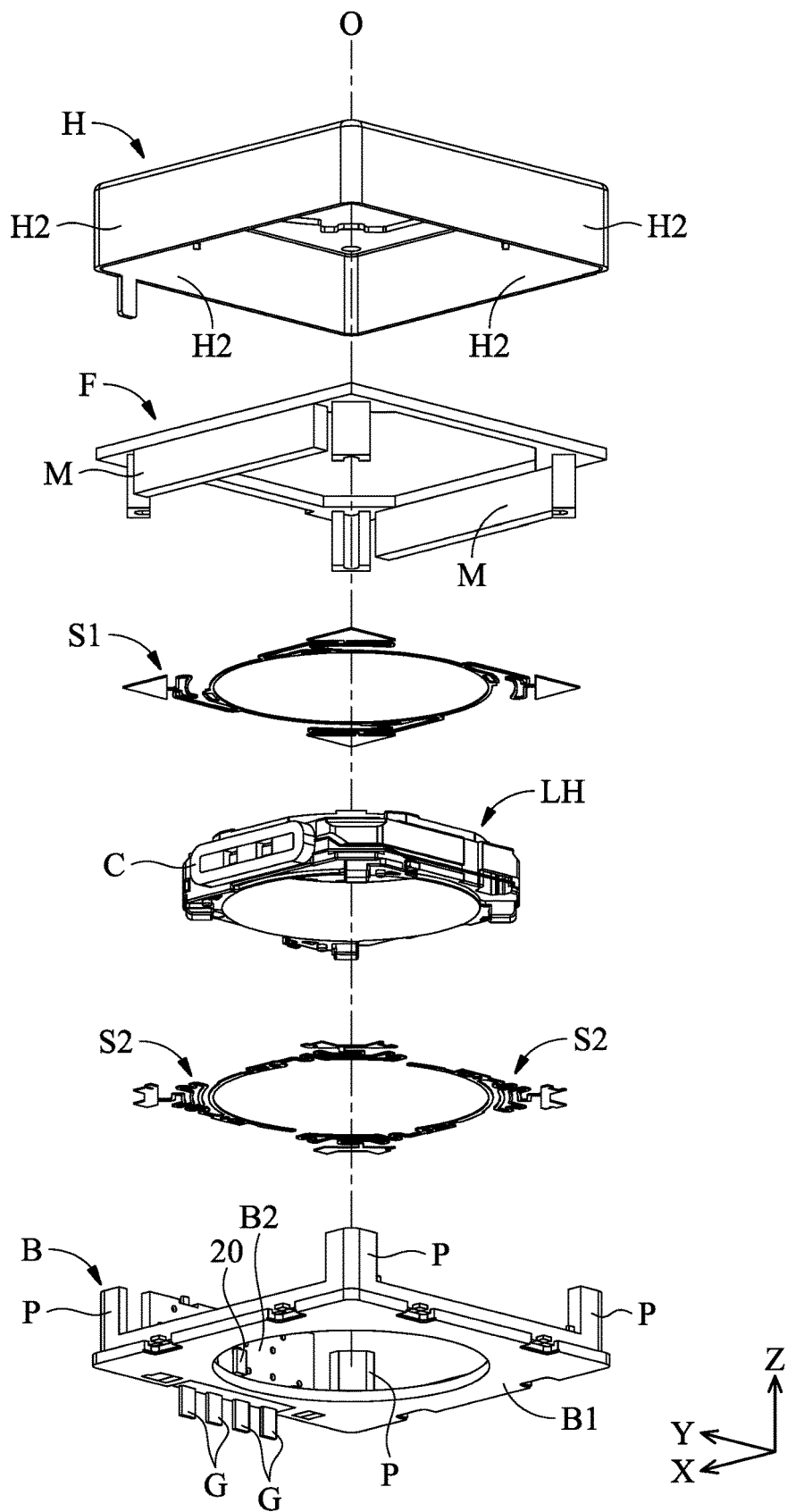
Figure 3:
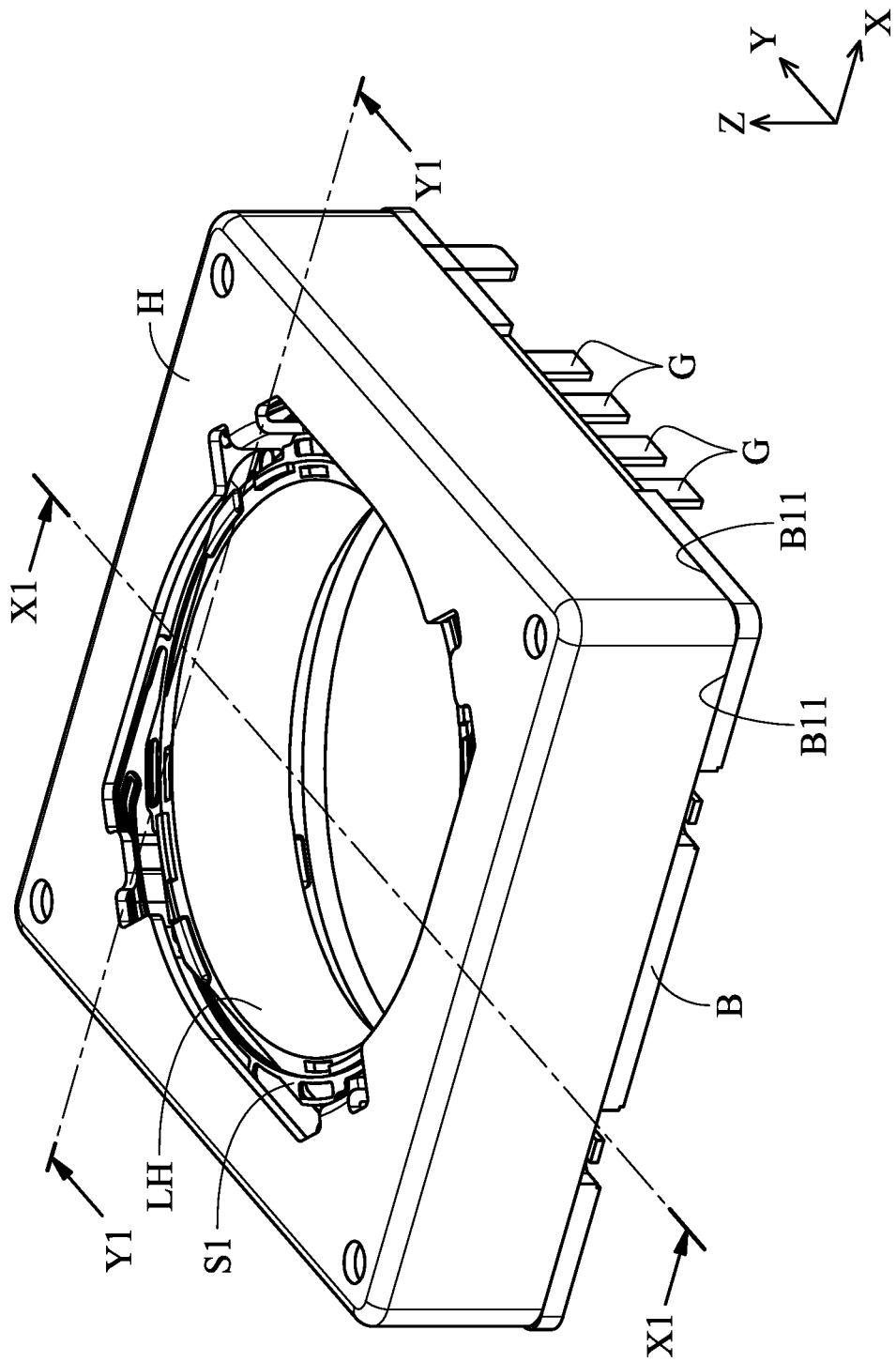
FIG. 3 shows a perspective diagram of the driving mechanism of FIG. 1 after assembly.
Figure 4:
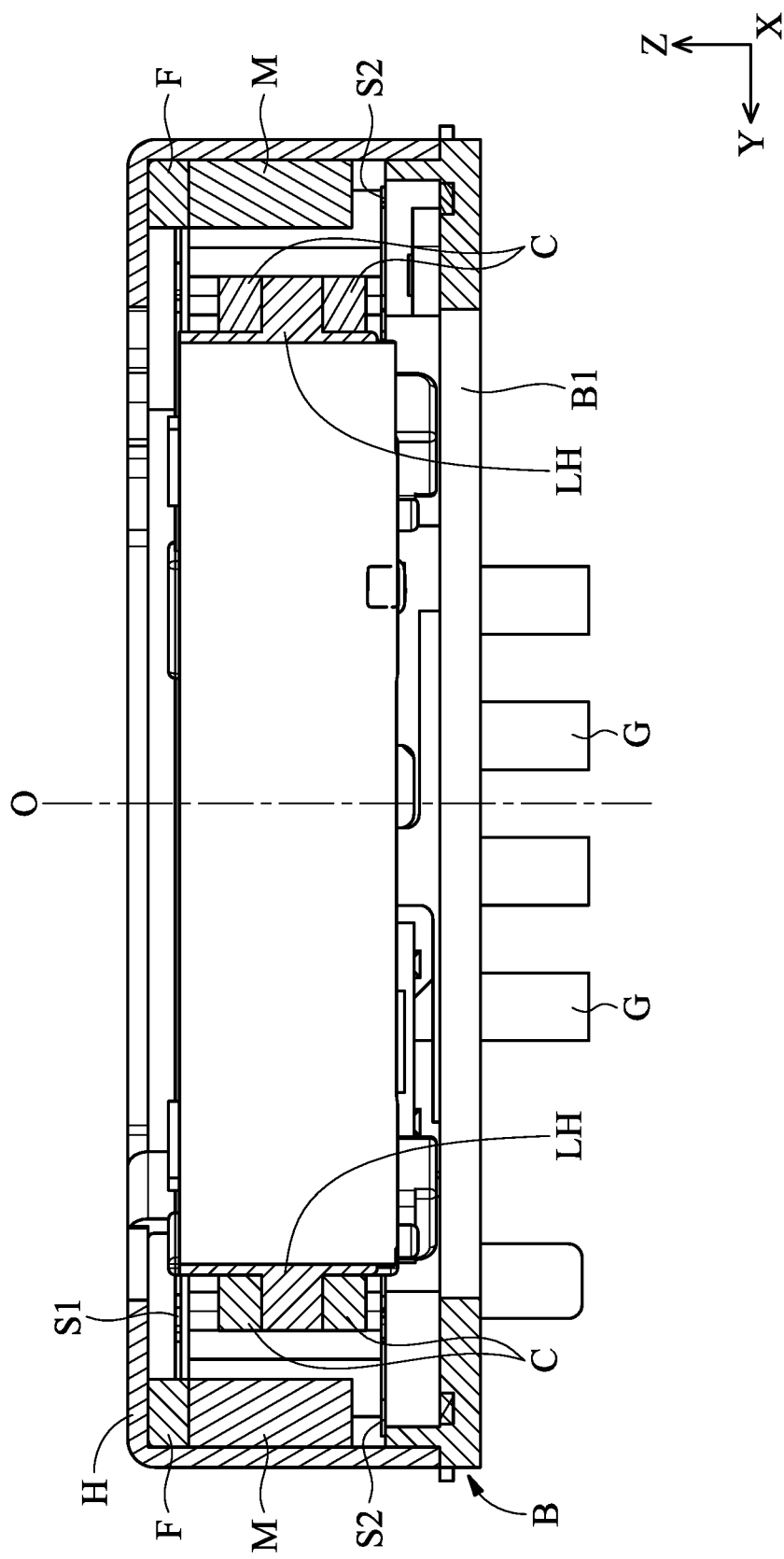
FIG. 4 shows a cross-sectional view taken along line X1-X1 in FIG. 3.
Figure 5:
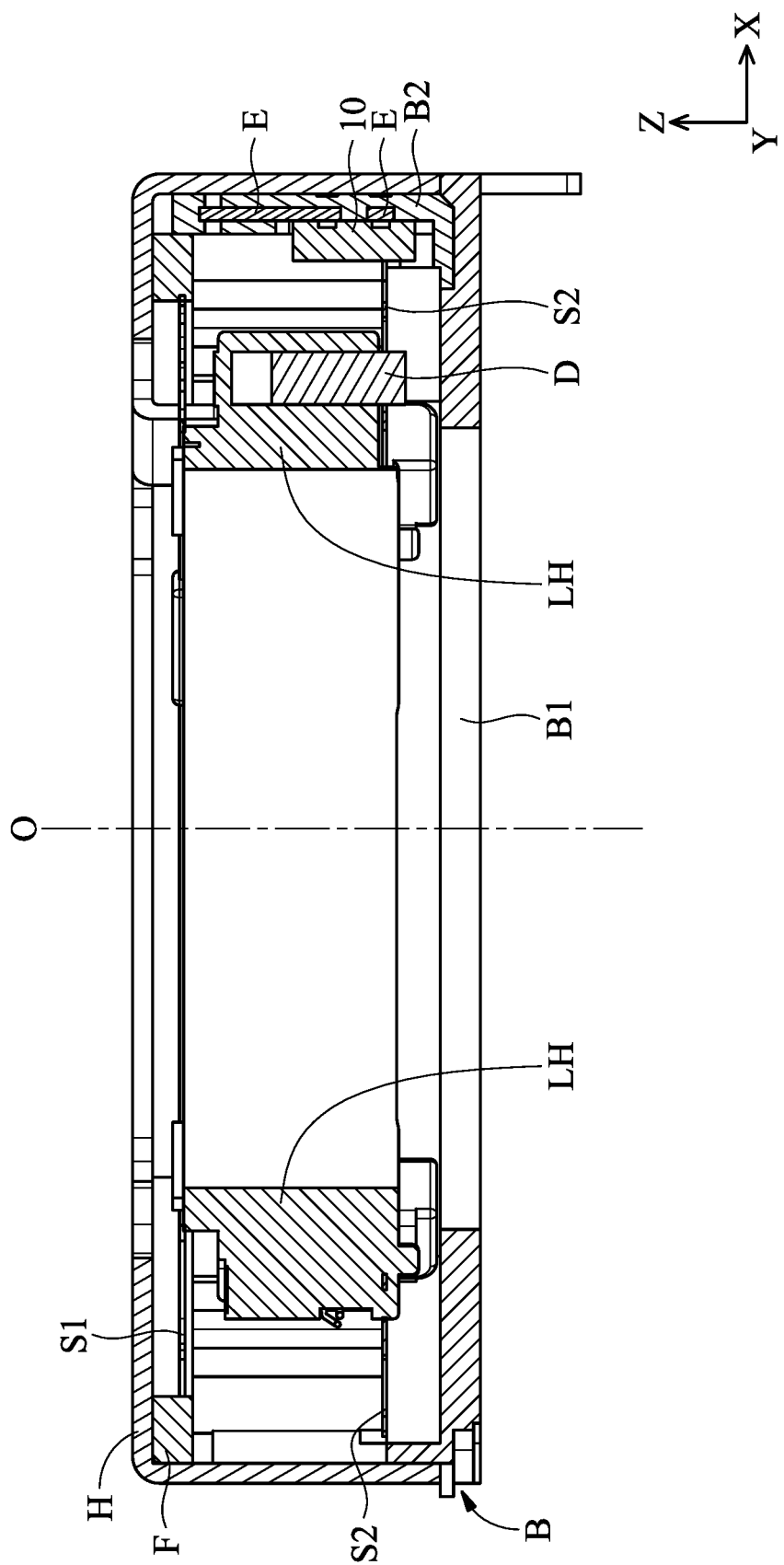
FIG. 5 shows a cross-sectional view taken along line Y1-Y1 in FIG. 3.

Referring to FIGS. 1-5, FIGS. 1 and 2 show exploded diagrams of a driving mechanism in accordance of an embodiment of the invention, FIG. 3 shows a perspective diagram of the driving mechanism of FIG. 1 after assembly, FIG. 4 shows a cross-sectional view taken along line X1-X1 in FIG. 3, and FIG. 5 shows a cross-sectional view taken along line Y1-Y1 in FIG. 3.

In this embodiment, the driving mechanism may be a voice coil motor (VCM) provided in handheld digital products such as mobile phones or tablet PCs. The riving mechanism can be used for driving an optical element (e.g. optical lens) to move, so as to perform auto-focusing (AF) or optical image stabilizer (OIS) function of an optical system (e.g. camera system), wherein the optical element defines an optical axis O.

Referring to FIGS. 1 to 5, the driving mechanism primarily includes a housing H, a frame F, at least a magnetic element M (e.g. magnet) affixed to the frame F, an upper spring S1, a holder LH, a coil C, at least a lower spring S2, and a base B.

As shown in FIGS. 1 and 2, the housing H has a top cover H1 and four sidewalls H2 extending from an edge of the top cover H1 along the optical axis O. The housing H and the base B constitute a fixed module, and the frame F is adhered to the inner surface of the housing H. The holder LH is movably disposed in the housing H, and an optical element (not shown) is held by the holder LH. In this embodiment, the holder LH is movably connected to the frame F and the base B via the upper and lower springs S1 and S2 (resilient elements), respectively. Hence, the holder LH constitutes a movable module that can move relative to the housing H and the base B along the optical axis O, wherein the optical axis O is parallel to the Z direction.

Moreover, the magnetic element M and the coil C can constitute a driving assembly for driving the optical element to move. In this embodiment, two magnetic elements M are affixed to the frame F, and correspondingly, two oval coils C are affixed to the holder LH and adjacent to the magnetic elements M (FIG. 4). When a current is applied to the coils C, an electromagnetic force is generated by the coils C and the magnetic elements M to move the holder LH and the optical element relative to the housing H, the frame F, and the base B along the Z axis, whereby OIS or AF function of the optical system can be successfully performed. It should be noted that the coils C and the lower springs S2 can be electrically connected via conductive wires, and a current signal from an external circuit can be transferred sequentially through the coils S2 and the conductive wires to the coils C (driving assembly) on the holder LH.

Referring to FIGS. 1, 2, and 5, the base B has a quadrilateral main body B1, a wall B2 disposed on a side of the main body B1, and four protrusions P protruding upward from the four corners of the main body B1. In this embodiment, a position-sensing element 10 and a filter element 20 are disposed on the wall B2 and electrically connected to each other. The position-sensing element 10 is directly disposed on the base B to detect the movement of the movable module relative to the fixed module. Here, the position-sensing element 10 may be an integrated circuit (IC) element having a Hall effect sensor, and it can be used to detect the position of a magnetic element D in the holder LH (FIG. 5). Therefore, the displacement of the holder LH relative to the base B can be precisely detected.

Figure 6:
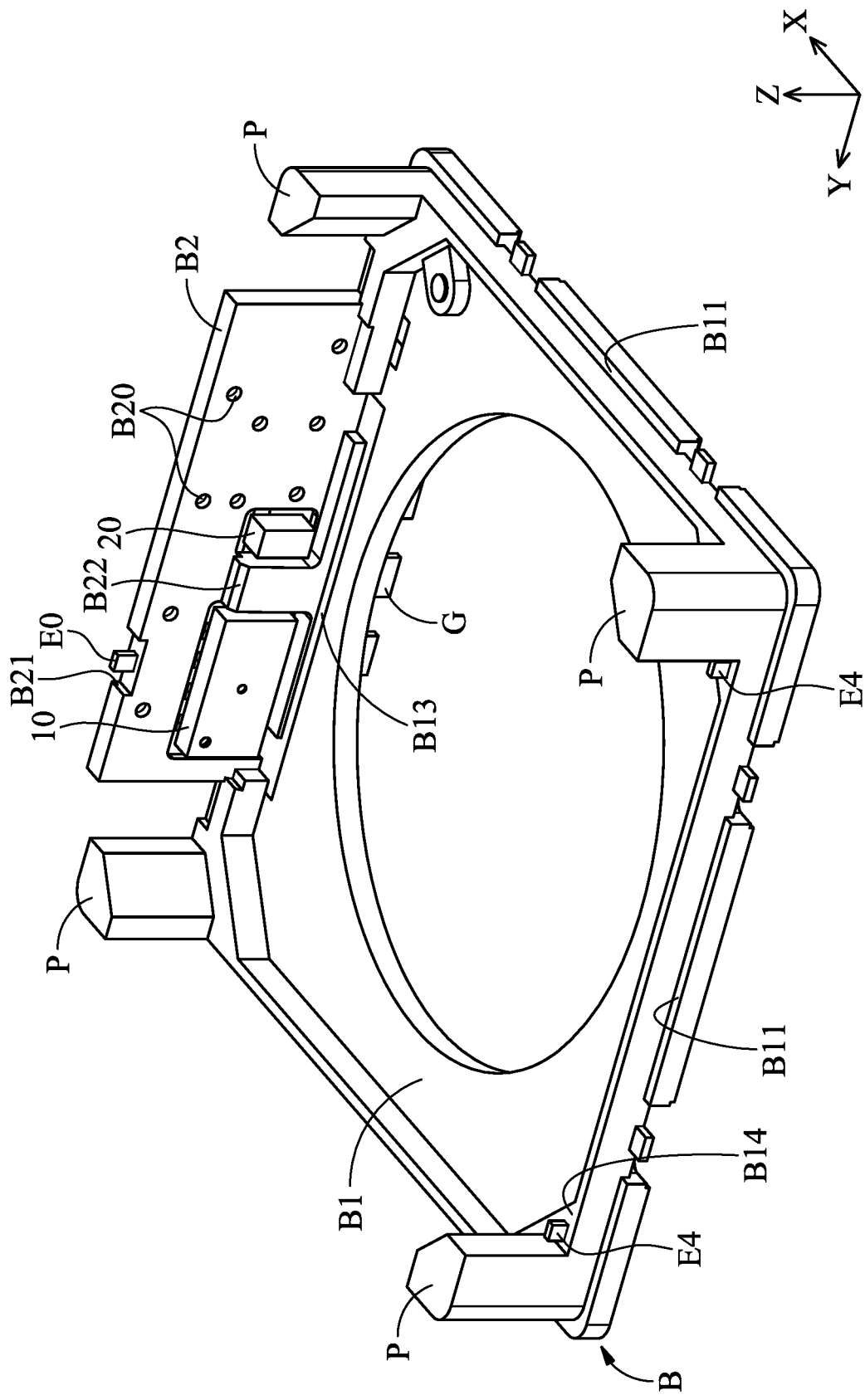
FIG. 6 is an enlarged view of the base B in FIG. 1.
Figure 7:
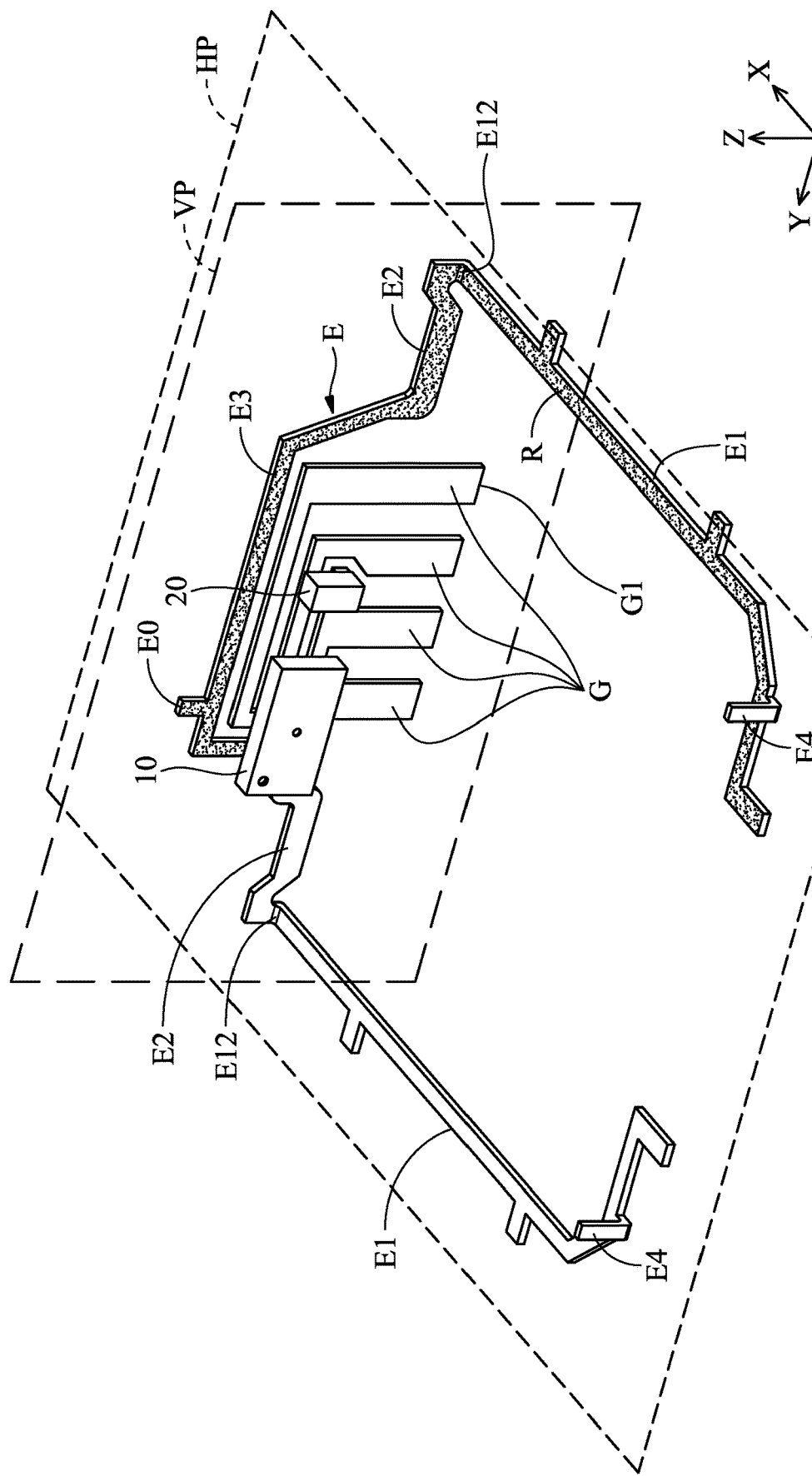
FIG. 7 is a perspective diagram of a 3D circuit E embedded in the base B of FIG. 6 and electrically connected to the position-sensing element 10 and the filter element 20.

As shown in FIGS. 1 and 3, several flanges B11 are formed at the peripheral of the main body B1. Specifically, the flange B11 forms a surface facing the sidewall H2 and perpendicular to the optical axis O. During assembly, the flange B11 abuts the sidewall H2, so that the housing H and the base B are firmly connected to each other (FIG. 3). As shown in FIG. 5, the wall B2 contacts only one of the four sidewalls H2 (FIG. 2). The wall B2 and the main body B1 are made of the same material. As shown in FIG. 6, the filter element 20, the stopper B22 and the position-sensing element 10 are arranged in a direction that is parallel to the wall B2. As shown in FIG. 6 and FIG. 7, the main body B1 (FIG. 6) is parallel to a horizontal plane HP (FIG. 7), the wall B2 is parallel to a reference plane VP (vertical plane), and the horizontal plane HP is perpendicular to the reference plane VP.

FIG. 6 is an enlarged view of the base B in FIG. 1, and FIG. 7 is a perspective diagram of a 3D circuit E embedded in the base B of FIG. 6 and electrically connected to the position-sensing element 10 and the filter element 20. Referring to FIGS. 5, 6 and 7, a 3D circuit E is embedded in the base B, and the position-sensing element 10 and the filter element 20 can be electrically connected to an external circuit via the 3D circuit E. The 3D circuit E includes several conductive traces, and one of the conductive traces comprises a first segment E1, a second segment E2, and a third segment E3 connected to each other (FIG. 7). In this embodiment, the first segment E1 extends in a first direction parallel to a horizontal plane HP, and the second and third segments E2 and E3 are situated on a vertical plane VP (reference plane), wherein the first direction is substantially parallel to the X axis but not parallel to the vertical plane VP. As shown in FIG. 6, the wall B2 is located on one side of the main body B1.

In FIG. 7, the vertical plane VP (reference plane) is substantially parallel to the YZ plane, and the first and second segments E1 and E2 are connected to each other via a bent portion E12. Specifically, the 3D circuit E forms two first segments E1 extending along the X axis, wherein two conductive portions E4 are respectively formed on a side of the first segments E1 for electrically connecting to the lower springs S2. Thus, the lower springs S2 can electrically connect to the same IC (position-sensing element 10) via the conductive portions E4 of the 3D circuit E. Moreover, the 3D circuit E further has several legs G extending in the −Z direction to connect to an external circuit. As shown in FIG. 7, the bent portion E12 is in an arc shape. The bent portion E12 is between the first conductive portion E1 and the second conductive portion E2. The position-sensing element 10 is directly mounted on the 3D circuit E. The bent portion E12 is embedded in the base B (FIG. 6).

During manufacturing of the base B, before forming the bent portion E12 and the conductive portions E4 of the 3D circuit E, the plastic wall B2 can be formed to encompass a part of the 3D circuit E (e.g. the second and third segments E2 and E3) by insert molding or Molded Interconnect Device (MID) technology. Subsequently, the position-sensing element 10 and the filter element 20 are mounted to the inner surface of the wall B2 and electrically connected to the 3D circuit E such as by surface-mount technology (SMT).

After the SMT process, the bent portion E12 and the conductive portions E4 protruding from the wall B2 are forced and bent by mechanical manufacturing process (e.g. metal stamping), as the 3D structure shows in FIG. 7, so that the first segment E1 has an angle relative to the second and third segments E2 and E3. After forming the bent portion E12 and the conductive portions E4, the plastic main body B1 can be integrally formed with the first segments E1 and the wall B2 by performing insert molding or Molded Interconnect Device (MID) process again, so that the first segments E1 are embedded in the plastic main body B1 (FIG. 6). In this embodiment, the wall B2 and the first segments E1 are located on different sides of the quadrilateral base B.

Referring to FIG. 7, a continuous 3D surface R is defined by a conductive trace of the 3D circuit. Specifically, the 3D surface R extends sequentially through the first, second, and third segments E1, E2, and E3, wherein the height of the first segment E1 along the optical axis O (Z direction) is less than the height of the second segment E2 or the third segment E3 along the optical axis O.

Since the metal 3D circuit E is directly formed with and embedded in the base B, printed circuit boards can be omitted from the driving mechanism, so as to save production cost and assembly time of the driving mechanism. Moreover, with the metal 3D circuit E embedded in the base B, the mechanical strength of the base B and the design flexibility of the circuits inside the driving mechanism can also be enhanced.

Referring back to FIG. 6, the wall B2 forms a recess B21, and the 3D circuit E further has an extending portion E0 in the recess B21 and connected to the third segment E3 (FIG. 7). With the extending portion E0 protruding from the top side (first side) of the wall B2 and received in the recess B21, unnecessary portion of the 3D circuit E can be easier to trim after integrally forming the plastic wall B2 with the second and third segments E2 and E3.

Figure 8:
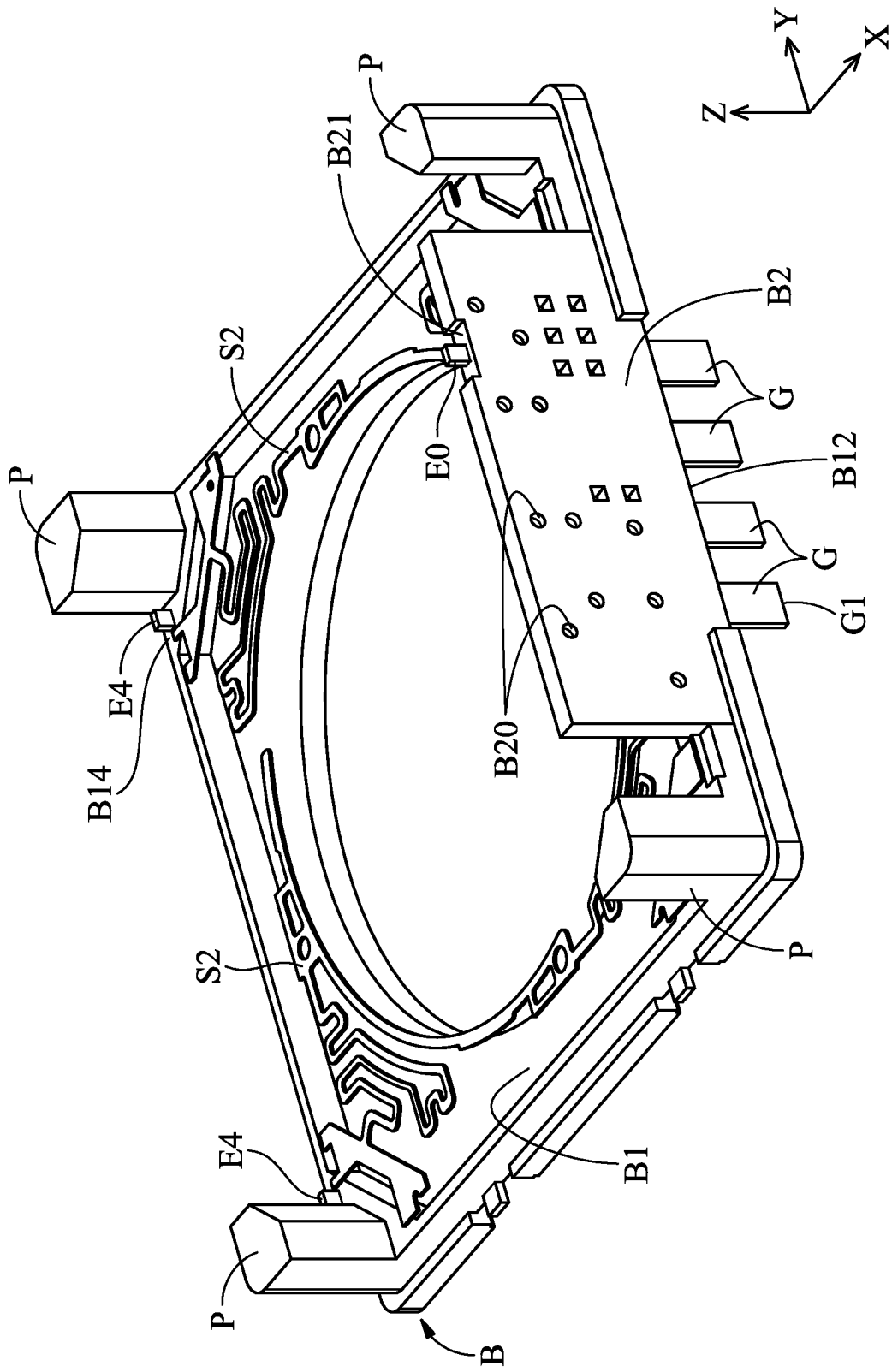
FIG. 8 shows a perspective diagram of the base B in FIG. 6 with two lower springs S2 disposed thereon after assembly of the driving mechanism.

FIG. 8 shows a perspective diagram of the base B in FIG. 6 with two lower springs S2 disposed thereon after assembly of the driving mechanism. In this embodiment, the two lower springs S2 can be electrically connected to the conductive portions E4 of the 3D circuit E such as by soldering, welding, or conductive adhesive. Thus, a current signal from an external circuit can be transferred sequentially through the 3D circuit E and the lower springs S2 to the coils C (driving assembly) on the holder LH. As shown in FIG. 8, the two conductive portions E4 are located on the same side of the quadrilateral base B.

Referring to FIGS. 6 and 8, a plurality of heat dissipation holes B20 are formed on opposite sides of the plastic wall B2, and the 3D circuit E are exposed to the heat dissipation holes B20 for rapid cooling of the driving mechanism. Moreover, the legs G of the 3D circuit E protrude from the bottom side (second side) of the wall B2 to connect to an external circuit. Still referring to FIGS. 6 and 8, the driving mechanism for driving the optical element further includes a circuit assembly E. The circuit assembly E is at least partially buried in the base B. The circuit assembly E includes a first conductive portion E1, a second conductive portion E2 and an external connecting portion G. The first conductive portion E1 is at least partially buried in the base B and has a long strip structure. The second conductive portion E2 is at least partially buried in the base B and has a long strip structure. The extending direction of the second conductive portion E2 is different from the extending direction of the first conductive portion E1. The external connecting portion G is at least partially buried in the base B and has a long strip structure. The extending direction of the external connecting portion G is different from the extending direction of the first conductive portion E1 and the extending direction of the second conductive portion E2. The extending direction of the second conductive portion E2 is perpendicular to the extending direction of the first conductive portion E1. The extending direction of the external connecting portion G is perpendicular to the extending direction of the first conductive portion E1 and the extending direction of the second conductive portion E2. The external connecting portion G includes an end portion G1. The end portion G1 of the external connecting portion G protrudes from a first surface B12 of the base (as shown in FIG. 8). The second conductive portion E2 is above the first surface B12 when viewed along the extending direction of the first conductive portion E1 (referring to FIGS. 7 and 8 together). The end portion G1 is below the first surface B12 when viewed along the extending direction of the first conductive portion E1 (referring to FIGS. 7 and 8 together). The base B includes a protruding portion B22 protruding from a second surface B13 of the base B along a direction that is parallel to the optical axis (the Z axis) of the optical element (as shown in FIG. 6). The second surface B13 is parallel to the first surface B12 of the base B. The driving mechanism includes a position-sensing assembly for sensing the movement of the movable portion LH. The position-sensing element 10 of the position-sensing assembly is disposed on the base B and electrically connected to the second conductive portion E2 (referring to FIGS. 6 and 7 together). The driving mechanism includes an electronic element 20. The electronic element 20 is electrically connected to the circuit assembly E. The protruding portion B22 is located between the position-sensing element 10 and the electronic element 20 when viewed along the extending direction of the first conductive portion E1 (referring to FIGS. 6 and 7 together). The circuit assembly E further includes an internal connecting portion E4 electrically connected to the driving assembly. The internal connecting portion E4 has a long strip structure. The internal connecting portion E4 is above the first surface B12 when viewed along the extending direction of the first conductive portion E1 (referring to FIGS. 7 and 8 together). The extending direction of the internal connecting portion E4 is parallel to the optical axis O of the optical element. The internal connecting portion E4 protrudes from a third surface B14 of the base B. The protruding direction of the internal connecting portion E4 is opposite to the protruding direction of the end portion G1. The internal connecting portion E4 and the external connecting portion G are positioned on opposite sides of the base B. The third surface B14 is parallel to the first surface B12 (referring to FIG. 8). The second conductive portion E2 and the external connecting portion G are positioned on the same side of the base B. The first conductive portion E1 and the external connecting portion G are positioned on different sides of the base B. As shown in FIG. 6, the wall B2 is connected to the protruding portion B22.

Figure 9:
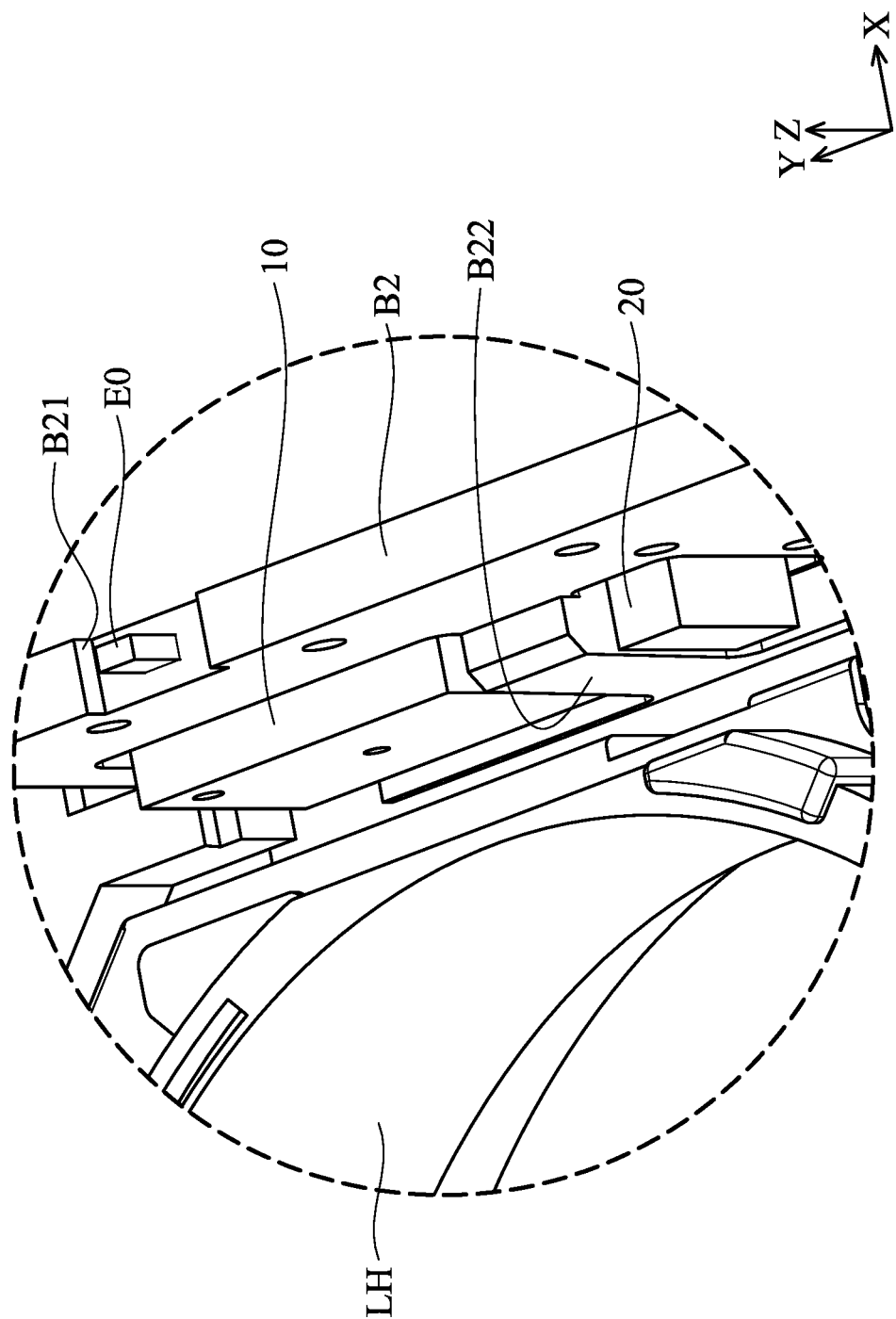
FIG. 9 is a partial enlarged view of the base B that has a stopper B22 closer to the holder LH than the position-sensing element 10 and the filter element 20.

FIG. 9 is a partial enlarged view of the base B that has a stopper B22 closer to the holder LH than the position-sensing element 10 and the filter element 20. As shown in FIG. 9, the base B forms a stopper B22 between the position-sensing element 10 and the filter element 20. The stopper B22 can be used to contact and restrict the holder LH in a limit position, so that the position-sensing element 10 and the filter element 20 are prevented from collision by the holder LH (movable module). Here, the stopper B22 is closer to the holder LH than the position-sensing element 10 and the filter element 20. Also, the stopper B22 is closer to the optical axis O (FIG. 5) than the position-sensing element 10.

Figure 10:
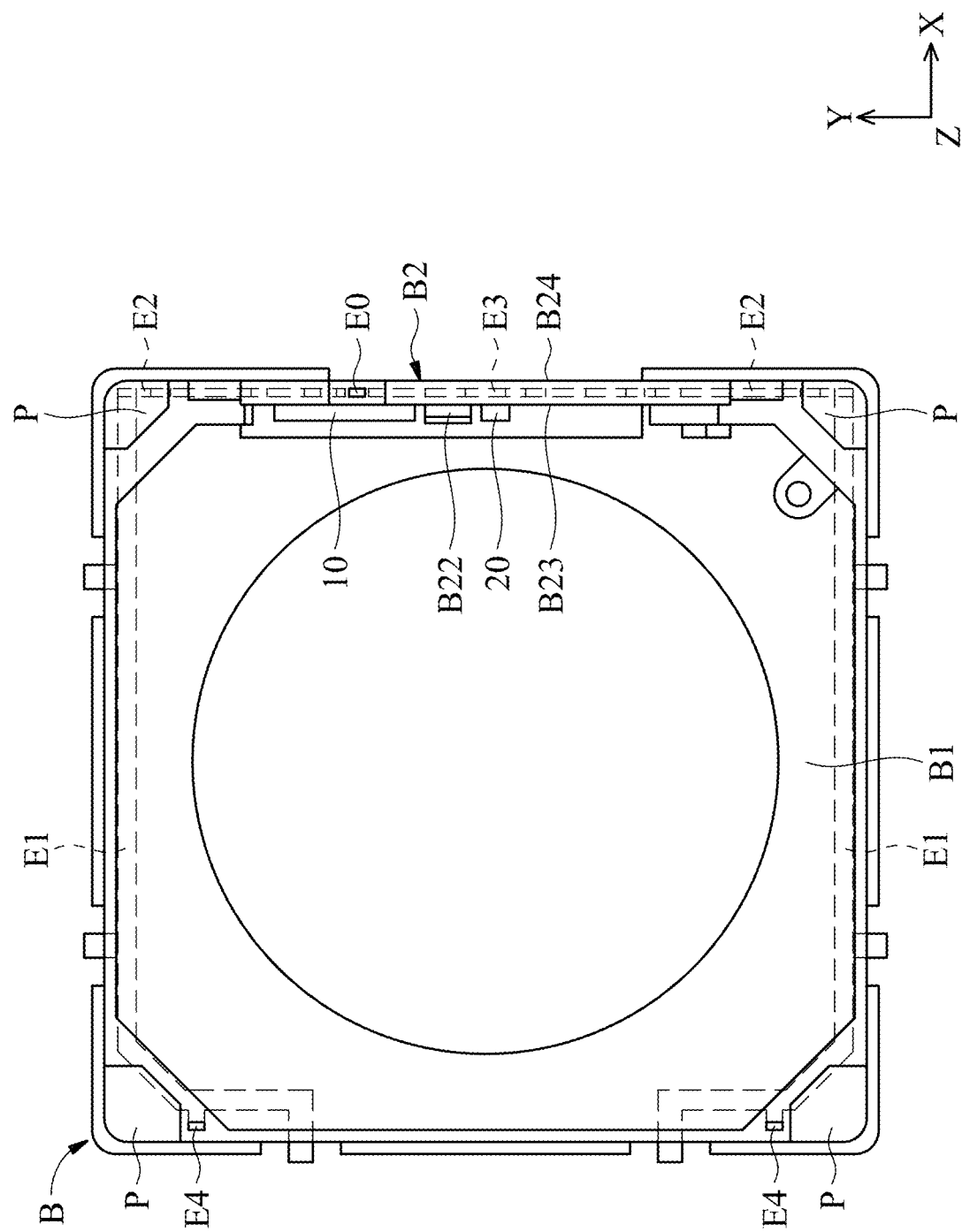
FIG. 10 is a top view showing the protrusions P of the base B overlap with the second segments E2 of the 3D circuit E when viewed along the Z axis.

FIG. 10 is a top view showing the protrusions P of the base B overlap with the second segments E2 of the 3D circuit E when viewed along the Z axis. As shown in FIG. 10, the segments E2 of the 3D circuit E may be embedded in the protrusions P or embedded in the main body B1 below the protrusions P, so as to facilitate efficient utilization of the space inside the base B for circuit routing and enhance the mechanical strength of the base B. When viewed along the Z axis, the protrusions P overlap with a part of the 3D circuit E (e.g. the second segments E2), thus enhancing the mechanical strength of the base B. As shown in FIG. 10, the wall B2 comprises a first surface B23 and a second surface B24 that are on opposite sides of the wall B2. The first surface B23 and the second surface B24 are both parallel to the optical axis O (FIG. 1). The position-sensing element 10 is disposed on the first surface B23 of the wall B2. The third conductive portion E3 is located between the first surface B23 and the second surface B24 when viewed along the optical axis O (FIG. 1).

Figure 11:
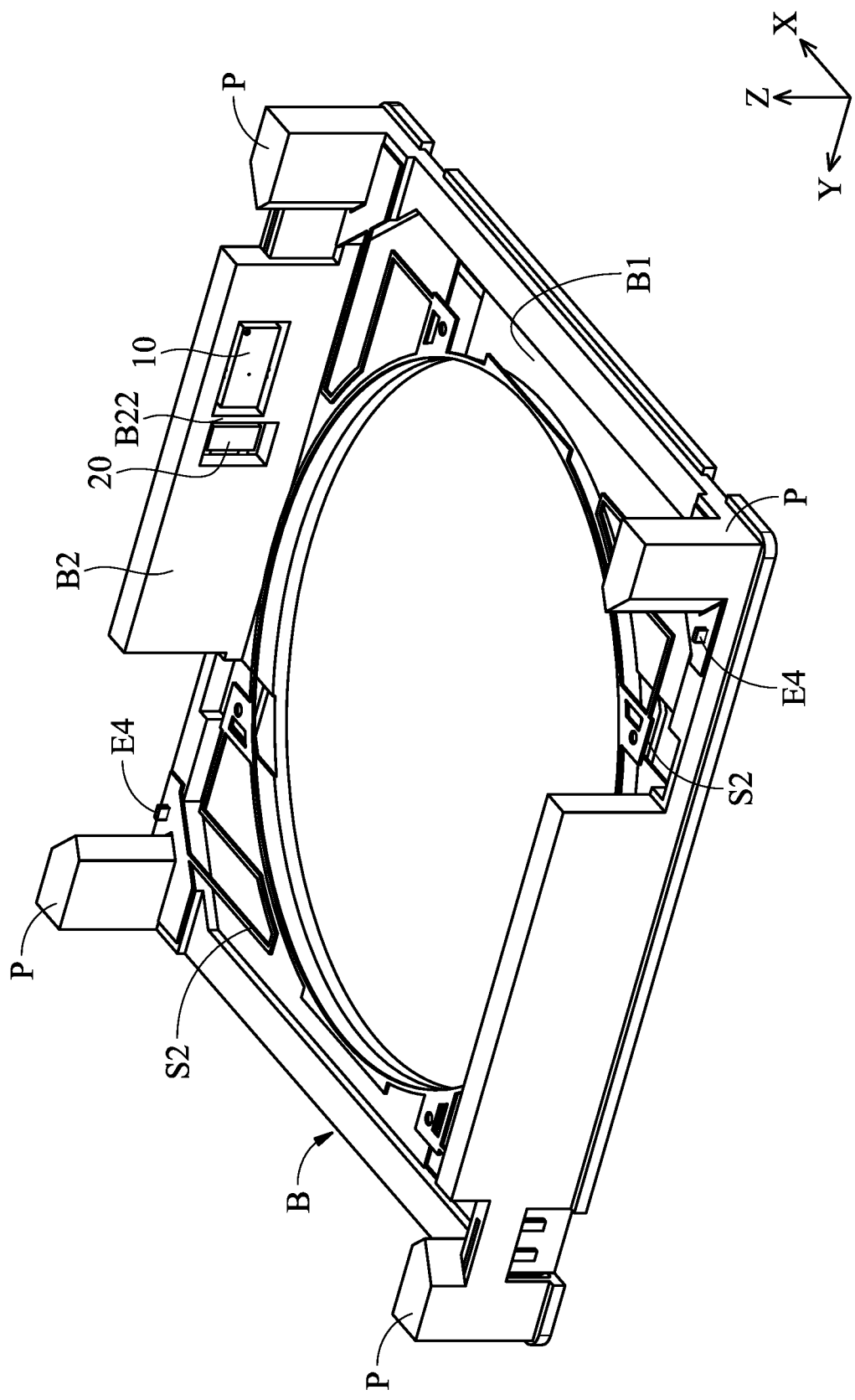
FIG. 11 is a perspective diagram showing a lower spring S2 connected to a base B in accordance of another embodiment of the invention.

FIG. 11 is a perspective diagram showing a lower spring S2 connected to a base B in accordance of another embodiment of the invention. The base B in this embodiment is different from the base B of FIGS. 6-8 in that the two conductive portions E4 of the 3D circuit E extend through the lower spring S2, and they may be electrically connected to each other by soldering, welding, or conductive adhesive. Moreover, as shown in FIG. 11, the two conductive portions E4 are located at two diagonal corners of the quadrilateral base B, so that efficient utilization of the space inside the driving mechanism can be achieved, and the design flexibility of the circuits can be therefore improved.

Figure 12:
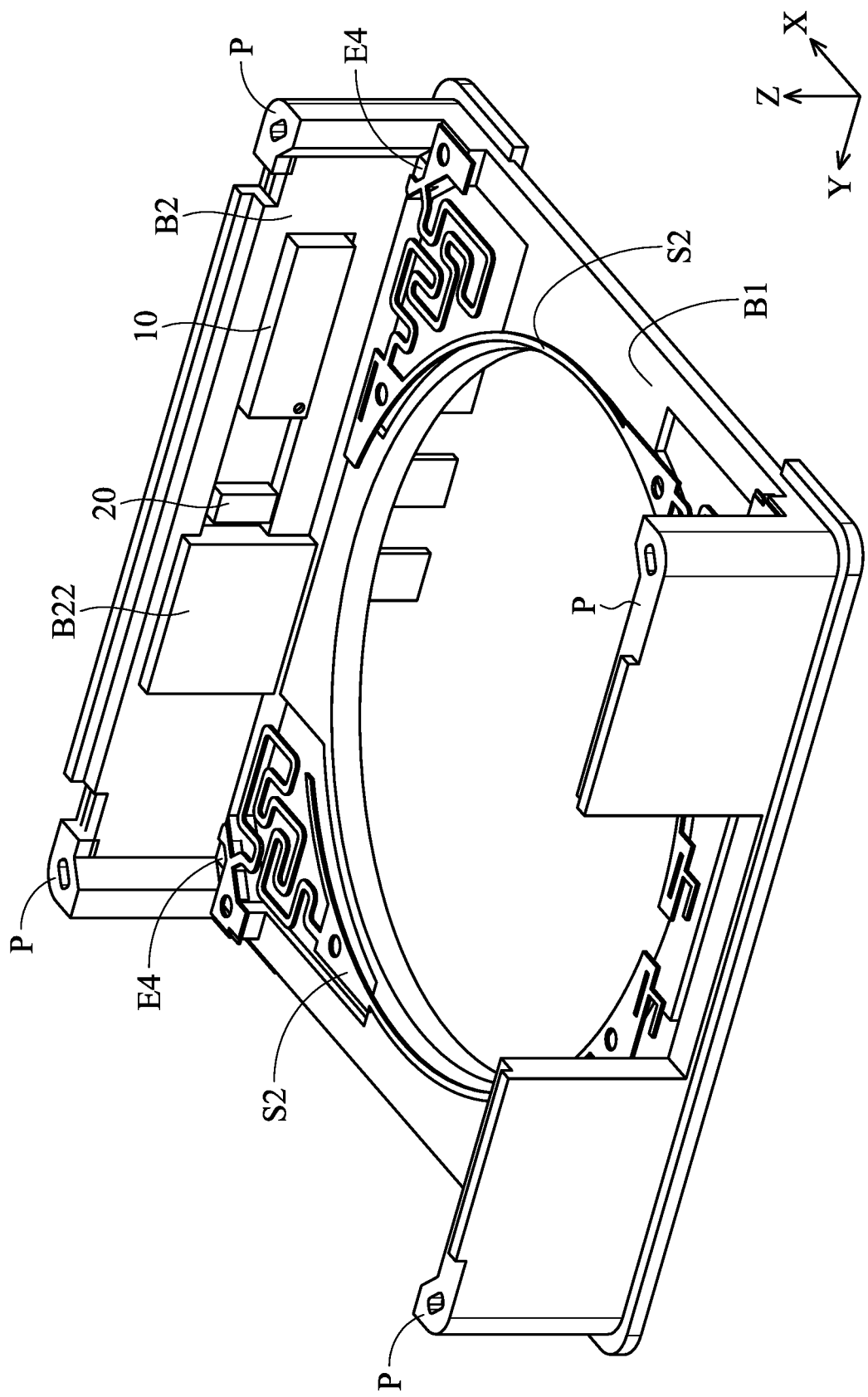
FIG. 12 is a perspective diagram showing two lower springs S2 connected to a base B in accordance of another embodiment of the invention.

FIG. 12 is a perspective diagram showing two lower springs S2 connected to a base B in accordance of another embodiment of the invention. The base B in this embodiment is different from the base B of FIGS. 6-8 in that the conductive portions E4 of the 3D circuit E are exposed to a surface of the main body B1 of the base B, and the conductive portions E4 and the lower springs S2 may be electrically connected to each other by soldering, welding, or conductive adhesive. Moreover, as shown in FIG. 12, the two conductive portions E4, the wall B2, and the second and third segments E2 and E3 embedded in the wall B are all located near the same side of the quadrilateral base B, so that efficient utilization of the space inside the driving mechanism can be achieved, and the design flexibility of the circuits can be therefore improved.

In summary, an embodiment of the invention provides a driving mechanism having a 3D circuit E and a plastic base B integrally formed with the 3D circuit E in one piece. With the 3D circuit E embedded in the base B, printed circuit boards can be omitted from the driving mechanism, so as to save production cost and simplify the assembly process. Additionally, since the metal 3D circuit E is directly embedded in the base B, the mechanical strength of the base B and the reliability of the product can be enhanced, and miniaturization of the driving mechanism can also be achieved.

Although some embodiments of the present disclosure and their advantages have been described in detail, it should be understood that various changes, substitutions and alterations can be made herein without departing from the spirit and scope of the disclosure as defined by the appended claims. For example, it will be readily understood by those skilled in the art that many of the features, functions, processes, and materials described herein may be varied while remaining within the scope of the present disclosure. Moreover, the scope of the present application is not intended to be limited to the particular embodiments of the process, machine, manufacture, compositions of matter, means, methods and steps described in the specification. As one of ordinary skill in the art will readily appreciate from the disclosure of the present disclosure, processes, machines, manufacture, compositions of matter, means, methods, or steps, presently existing or later to be developed, that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps. Moreover, the scope of the appended claims should be accorded the broadest interpretation so as to encompass all such modifications and similar arrangements.

While the invention has been described by way of example and in terms of preferred embodiment, it should be understood that the invention is not limited thereto. On the contrary, it is intended to cover various modifications and similar arrangements (as would be apparent to those skilled in the art). Therefore, the scope of the appended claims should be accorded the broadest interpretation to encompass all such modifications and similar arrangements.

What is claimed is:

1. A driving mechanism for driving an optical element, comprising:

a movable portion for connecting the optical element;
a fixed portion comprising a base, and the movable portion is movable relative to the fixed portion;
a driving assembly for driving the movable portion to move relative to the fixed portion; and
a circuit assembly, at least partially buried in the base;
wherein the circuit assembly comprises:
a first conductive portion, at least partially buried in the base and having a long strip structure;
a second conductive portion, at least partially buried in the base and having a long strip structure, wherein an extending direction of the second conductive portion is different from an extending direction of the first conductive portion; and
an external connecting portion, at least partially buried in the base and having a long strip structure, wherein an extending direction of the external connecting portion is different from the extending direction of the first conductive portion and the extending direction of the second conductive portion;
wherein the external connecting portion comprises an end portion protruding from a first surface of the base, and the second conductive portion is above the first surface when viewed along the extending direction of the first conductive portion, and the end portion is below the first surface when viewed along the extending direction of the first conductive portion;
wherein the base comprises a protruding portion protruding from a second surface of the base along a direction parallel to an optical axis of the optical element, and the second surface is parallel to the first surface of the base;
wherein the driving mechanism further comprises a position-sensing assembly for sensing the movement of the movable portion, and a position-sensing element of the position-sensing assembly is disposed on the base and electrically connected to the second conductive portion;
wherein the driving mechanism further comprises an electronic element electrically connected to the circuit assembly, wherein the protruding portion is located between the position-sensing element and the electronic element when viewed along the extending direction of the first conductive portion.

2. The driving mechanism as claimed in claim 1, wherein the extending direction of the second conductive portion is perpendicular to the extending direction of the first conductive portion, and the extending direction of the external connecting portion is perpendicular to the extending direction of the first conductive portion and the extending direction of the second conductive portion.

3. The driving mechanism as claimed in claim 1, wherein the circuit assembly further comprises an internal connecting portion electrically connected to the driving assembly, and the internal connecting portion has a long strip structure.

4. The driving mechanism as claimed in claim 3, wherein the internal connecting portion is above the first surface when viewed along the extending direction of the first conductive portion.

5. The driving mechanism as claimed in claim 3, wherein an extending direction of the internal connecting portion is parallel to the optical axis of the optical element.

6. The driving mechanism as claimed in claim 3, wherein the internal connecting portion protrudes from a third surface of the base, a protruding direction of the internal connecting portion is opposite to a protruding direction of the end portion, and the third surface is parallel to the first surface.

7. The driving mechanism as claimed in claim 3, wherein the internal connecting portion and the external connecting portion are positioned on opposite sides of the base.

8. The driving mechanism as claimed in claim 3, wherein the second conductive portion and the external connecting portion are positioned on the same side of the base.

9. The driving mechanism as claimed in claim 3, wherein the first conductive portion and the external connecting portion are positioned on different sides of the base.

10. The driving mechanism as claimed in claim 3, further comprising a lower spring, wherein the movable portion is movably connected to the base via the lower spring.

11. The driving mechanism as claimed in claim 10, wherein the internal connecting portion is formed and partially buried in the base to electrically connect to the lower spring.

12. The driving mechanism as claimed in claim 10, wherein the lower spring is electrically connected to the position-sensing element via the internal connecting portion of the circuit assembly.

13. The driving mechanism as claimed in claim 3, wherein the circuit assembly further comprises a third conductive portion; and the first conductive portion, the second conductive portion and the third conductive portion are connected to each other, the second conductive portion and the third conductive portion are situated on a vertical plane, and the vertical plane is perpendicular to the extending direction of the first conductive portion, wherein the base further comprises a wall formed to embed the second conductive portion and the third conductive portion, the wall and the internal connecting portion are located on opposite sides of the base, and the wall is connected to the protruding portion.

* * * * *